(No Model.) 2 Sheets—Sheet 2.
D. BRUNSON.
CULTIVATOR.
No. 316,942. Patented May 5, 1885.
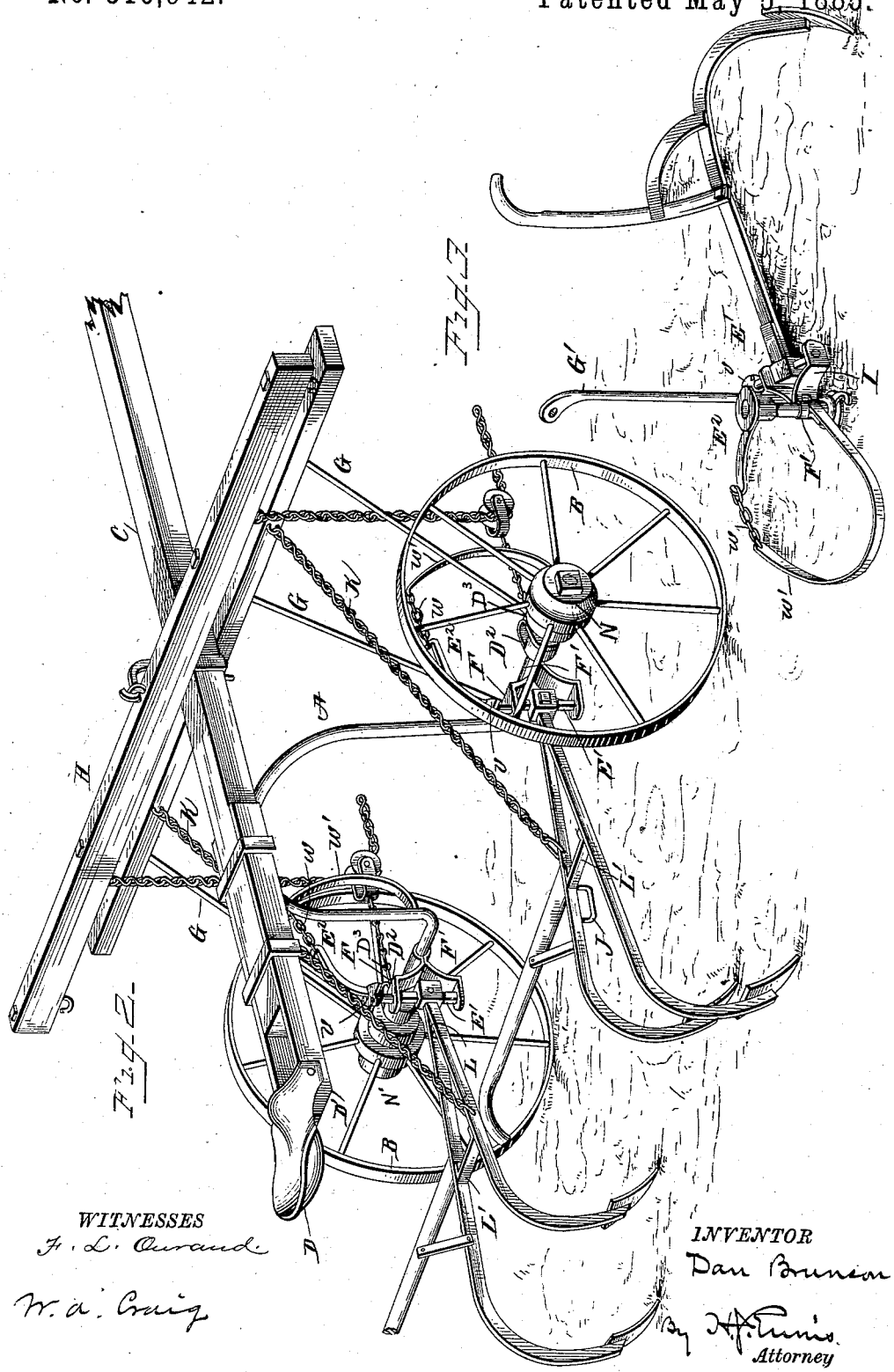
WITNESSES
F. L. Ourand
W. A. Craig
INVENTOR
Dan Brunson
By H. A. Tunis
Attorney

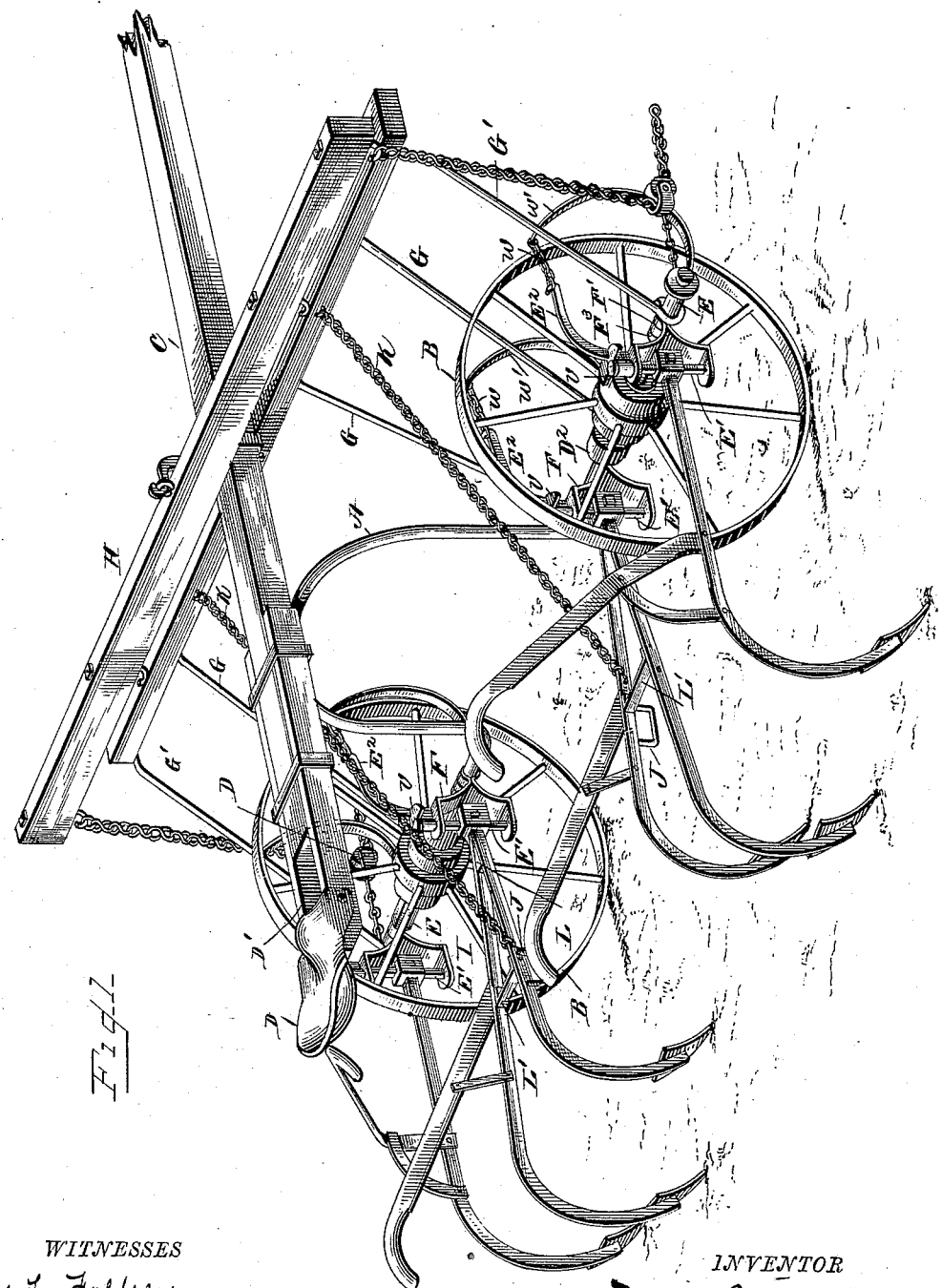

United States Patent Office.

DAN BRUNSON, OF JEWELL CITY, KANSAS.

CULTIVATOR.

SPECIFICATION forming part of Letters Patent No. 316,942, dated May 5, 1885.

Application filed March 17, 1885. (No model.)

*To all whom it may concern:*

Be it known that I, DAN BRUNSON, a citizen of the United States, residing at Jewell City, in the county of Jewell and State of Kansas, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to combined walking and riding cultivators; and it consists in the novel construction and combination of parts, as will be hereinafter fully described, and particularly pointed out in the claims.

Figure 1 is a perspective view of a combined walking and riding cultivator embodying my invention. Fig. 2 is a similar view with the outside extensions removed, and Fig. 3 is a view of one of the extensions detached from the machine proper.

Referring by letter to the accompanying drawings, A designates the arched axle, B B the riding-wheels, and C the tongue.

D designates the driver's seat, which is adjustably connected to the rear end of the tongue D', (which extends some distance in rear of the axle A,) and may be moved forward or backward at will, to render it suitable for drivers of different weights, and thereby relieve the necks of the horses while plowing.

Between the wheels, and near the hubs of the same, the horizontal portions of the arched axle A are provided with swinging clevises $D^2$, having hooks $D^3$, to which the draft-chains are to be attached when the implement is to be used as a two-horse cultivator.

When the implement is to be used as a four-horse cultivator, which is its primitive form, the journals of the axle are provided with extensions E, which screw onto the ends of the axle, and are provided with vertical pivot-rods E', to which the forward ends of the plow-beams are adjustably connected, so that by moving the front end of the plow-beam up the plow will be set to cut deeper, and by moving the plow-beam down on its pivot-rod the plow will be set to cut shallower. The vertical pivot-rods E' are supported in brackets F, which have eyes F', that slip upon the extensions E, and are held in place by collars $F^3$. Braces G and G' extend from the cross-beam H to the axle at its straight portions between the wheels, and also from the cross-beam to the extensions outside of the wheels and outside of the hinged brackets I upon the extensions E. The pivot-rods E' are rectangular in cross-section, except at their bearing-points, where they are round, and they are held in place by their own gravity.

From the upper ends of the pivot-rods E' arms $E^2$ extend forwardly and upwardly and are curved. These arms move in lateral planes when actuated by the movement of the beam. The bearings for the pivot-rods E' diverge from the axle and toward the rear side thereof, and the front ends of the plow-beams are secured adjustably to said rods by means of set-screws, so that the plows can be adjusted to the desired depth by simply raising or lowering the front ends of the plow-beams.

The intermediate plows are provided with stirrups for the driver's feet, as shown at J, so that the driver can, if necessary, guide these plows by employing his feet, while at the same time he can guide the outside plows with his hands. Each of the sets of plows are connected to the cross-beam by chains K, which engage hooks on the said cross-beam, and said chains may be adjusted to suit the depth to which it is desired to plow or cultivate.

The plow-beams—that is, the two intermediate sets when all are used—are made in pairs and diverge rearwardly, and a wedge, L, is placed at the junction of the beams to give the proper angle, a brace-rod and brace, L', being interposed between the arms of the beam to hold them in position. The intermediate pairs of plows are also provided with handles, which may be used, if desired, especially when the plow is used as a walking-plow.

When used as a riding-plow, as before stated, the intermediate sets of plows are controlled by the driver's feet while occupying the driver's seat. When used simply to cultivate two sides of a row of standing plants, the outside or end plows are removed, and the draft is much lightened thereby, and two horses only need then be used, and at this time the equalizing-chains should be between the wheels. When four horses are employed, the equalizer-chains should be outside of the wheels. The equalizer is also adjustable on the draft-beam, so that when the implement is used as a walking-plow it—the equalizer—may be moved back to relieve the horses' necks by moving the weight back. The arms E² are connected by chains $w$ with upwardly-curved and forwardly-extending springs $w'$, and the office of said springs is to help to lift the plows when the driver raises the handles. Upon the top of the pivot-rods E' are rigidly secured semicircular collars $v$, having a slot in their curved end, in which the arm E² rests, and these collars have a tendency to keep the plow-beams to their central line of draft. When the outside plows and the extensions are removed from the axle, nuts N N' are placed upon the ends of the axle to keep the wheels in place. The end braces are also removed when the machine is to be converted into a two-plow machine.

Having thus fully described my invention, what I claim as new, and desire to secure by Letters Patent of the United States, is—

1. The combination, with the arched axle, the supporting-wheels, and the intermediate hinged plows connected to the axle, of the removable journal-extensions and the two outside hinged plows connected to said extensions, substantially as specified.

2. The combination, with the main axle provided with double plows, of the end extensions, each provided with a single plow, as set forth.

3. The combination, with the axle having the removable extensions outside of the riding-wheels, of the plow-beams, the spring-actuated clevises articulated on said extensions removably connected to the axle outside of the riding-wheels, as set forth.

4. The combination, with the axle and the plow-beam, of the bracket F, with eye F', the pivot-rod E', collar $v$, the arm E², spring $w'$, and the chain $w$, connecting said arm and spring, substantially as set forth.

5. The combination, in a cultivator, of an arched axle provided with carrying-wheels, and having removable extension-axles E E, adapted to carry the auxiliary plows, as set forth.

In testimony whereof I affix my signature in presence of two witnesses.

DAN BRUNSON.

Witnesses:
E. H. BRADFORD,
H. J. ENNIS.